(12) United States Patent
Moren et al.

(10) Patent No.: US 6,359,068 B1
(45) Date of Patent: *Mar. 19, 2002

(54) HIGH-FRICTION POLYMER BLENDS COMPRISING POLYPROPYLENE AND THERMOPLASTIC BLOCK COPOLYMERS

(75) Inventors: Louis S. Moren, Mahtomedi; Dennis G. Welygan, Woodbury, both of MN (US)

(73) Assignee: 3M Innovative Properties Company, Saint Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,219

(22) Filed: Feb. 18, 1998

(51) Int. Cl.[7] .......................... C08L 53/02; C08L 23/12
(52) U.S. Cl. .......................................... 525/98; 525/240
(58) Field of Search ........................... 525/98, 71, 240; 524/504, 505

(56) References Cited

U.S. PATENT DOCUMENTS

| | | | |
|---|---|---|---|
| 3,294,868 A | | 12/1966 | Pritchard .................... 524/505 |
| 3,299,174 A | * | 1/1967 | Kuhre et al. .................. 525/98 |
| 3,407,253 A | | 10/1968 | Yoshimura et al. .......... 264/154 |
| 3,850,474 A | | 11/1974 | Welch ......................... 296/185 |
| 3,896,068 A | * | 7/1975 | Walker ......................... 525/98 |
| 4,076,669 A | * | 2/1978 | Harper ......................... 525/98 |
| 4,166,055 A | | 8/1979 | Lee, Jr. ........................ 524/141 |
| 4,196,731 A | | 4/1980 | Laurine et al. |
| 4,283,463 A | | 8/1981 | Shiga et al. ................. 428/512 |
| 4,305,990 A | * | 12/1981 | Kelly ............................ 525/98 |
| 4,347,158 A | | 8/1982 | Kaus et al. .................. 502/105 |
| 4,350,795 A | | 9/1982 | Bohm et al. ................. 525/194 |
| 4,385,142 A | | 5/1983 | Bohm et al. .................. 524/68 |
| 4,386,187 A | | 5/1983 | Grancio et al. ............... 525/96 |
| 4,386,188 A | | 5/1983 | Grancio et al. |
| 4,761,451 A | * | 8/1988 | Moteki et al. ................. 525/98 |
| 4,872,243 A | | 10/1989 | Fischer |
| 5,026,752 A | * | 6/1991 | Wakayabashi et al. ........ 525/98 |
| 5,077,870 A | | 1/1992 | Melbye et al. |
| 5,092,952 A | | 3/1992 | Minnick et al. |
| 5,171,619 A | | 12/1992 | Reuben ........................ 428/95 |
| 5,240,530 A | | 8/1993 | Fink ............................ 156/94 |
| 5,246,523 A | | 9/1993 | Minnick et al. |
| 5,248,368 A | | 9/1993 | Minnick et al. |
| 5,248,369 A | | 9/1993 | Minnick et al. |
| 5,248,373 A | | 9/1993 | Minnick et al. |
| 5,256,734 A | | 10/1993 | Sugihara et al. .............. 525/98 |
| 5,260,015 A | | 11/1993 | Kennedy et al. |
| 5,369,174 A | * | 11/1994 | Hasselbring .................. 525/71 |
| 5,372,620 A | | 12/1994 | Rowse et al. |
| 5,393,475 A | | 2/1995 | Murasaki et al. |
| 5,468,807 A | | 11/1995 | Tsurutani et al. ........... 525/240 |
| 5,504,139 A | | 4/1996 | Davies et al. ............... 524/504 |
| 5,535,927 A | | 7/1996 | Garrison ...................... 223/92 |
| 5,686,527 A | | 11/1997 | Laurin et al. |
| 5,686,533 A | * | 11/1997 | Gahleitner et al. ......... 525/240 |
| 5,777,031 A | * | 7/1998 | Djiauw et al. ................ 525/98 |
| 5,780,131 A | | 7/1998 | Paasonen et al. .......... 428/35.9 |
| 5,847,051 A | * | 12/1998 | Hwo et al. .................... 525/98 |
| 5,910,530 A | * | 6/1999 | Wang et al. ................. 524/534 |

FOREIGN PATENT DOCUMENTS

| | | | |
|---|---|---|---|
| EP | 0 241 667 A2 | 10/1987 | |
| EP | 0 499 472 A1 | 8/1992 | |
| EP | 0 712 892 A1 | 5/1996 | |
| JP | 58-215446 | 12/1983 | |
| JP | 163394 | * 6/1993 | .................. 525/98 |
| JP | 05-163394 | 6/1993 | |
| JP | 08 090740 A | 4/1996 | |
| JP | 10-001573 | 1/1998 | |
| WO | WO 93/04858 | 3/1993 | |
| WO | WO 95/33006 | 12/1995 | |
| WO | WO 96/21058 | 7/1996 | |
| WO | WO 97/32805 | 9/1997 | |

OTHER PUBLICATIONS

Brochure: 3M Traction Wrap for textile drive and pull rolls (1997).
Shell Chemical Company—Online Literature, "Modification of Thermoplastics With Kraton Polymers", pp. 1–28.
Gylord, Norman G., "Linear and Stereoregular Addition Polymers", Interscience Publishers, New York, 1959, p. 120.

* cited by examiner

*Primary Examiner*—Peter Szekely
(74) *Attorney, Agent, or Firm*—Gregory D. Allen

(57) ABSTRACT

Compositions have been created comprising a blend of a polypropylene having less than 90 percent isotactic linkages and thermoplastic block copolymers. Specifically, the thermoplastic block copolymers comprise hard segments of polystyrene combined with soft segments comprising 2 to 8 carbon atoms. Some of the physical characteristics of materials made by these composition are more desirable than the same physical characteristics of materials made of the polypropylene having less than 90 percent isotactic linkages used to make the composition and of the same physical characteristics of materials made of the thermoplastic block copolymer used to make the composition.

16 Claims, No Drawings

HIGH-FRICTION POLYMER BLENDS COMPRISING POLYPROPYLENE AND THERMOPLASTIC BLOCK COPOLYMERS

BACKGROUND OF THE INVENTION

The present invention relates to compositions comprising blends of polypropylene and thermoplastic block copolymers.

Many polymer blends are known and used in different industries. For example, polymer blends are important in the development of pressure-sensitive adhesives that are used to make tapes and transdermal patches. The characteristics of a pressure sensitive adhesive depends on the amount and the types of polymers used to make the adhesive. Preferred pressure sensitive adhesives include rubber-based adhesives, which consist of blends of natural or synthetic rubber and tackifier resins. Typically the use of thermoplastic block copolymers in adhesive compositions provide strength and shear resistance in the adhesive. Other examples that include polypropylene and thermoplastic block copolymer blends are used to produce compositions amiable to molding processes. The resultant thermoplastic blends having high impact resistance, good oxidative stability, and are used in a variety of applications.

The thermoplastic block copolymers used in polymer blends are a unique class of elastomers. Some block copolymers have hard segments of polystyrene combined with soft segments, such as the commercially available KRATON thermoplastic polymers, sold by the Shell Chemical Company, Houston, Tex. These thermoplastic block copolymers can be blended with many plastics, such as styrenics, polyolefins and engineering thermoplastics to improve their performance, particularly their impact properties. These thermoplastic block copolymers toughen such plastics both at room and low temperatures and can also make dissimilar plastics compatible. And with the right grade of thermoplastic block copolymers, such toughening or compatibilization can be achieved efficiently, while retaining high heat resistance, good processability, good weatherability, and in certain cases, clarity.

Mixing thermoplastic block copolymers with plastics typically produce compositions having measured physical characteristics between the measured physical characteristics of the plastic or the thermoplastic block copolymer used to make the compositions. Specifically, compositions produced by mixing a thermoplastic block copolymer and an isotactic polypropylene having about 100 percent isotactic linkages will usually have toughness and abrasion resistance measurements between the toughness and abrasion resistance measurements of the specified thermoplastic block copolymer and the specified polypropylene used to make the composition.

SUMMARY OF THE INVENTION

The present invention embodies blends including polypropylenes and thermoplastic block copolymers, wherein the blend has specific physical characteristic more desirable than the physical characteristic of the polypropylene and the thermoplastic block copolymer used to make the blend. One embodiment of the invention is a composition comprising a polypropylene including less than 90 percent isotactic linkages, and a thermoplastic block copolymer comprising hard segments of polystyrene combined with soft segments comprising carbon chains including 2 to 8 carbon atoms. The breaking stress measurement of the composition is greater than the breaking stress measurement of the specified polypropylene and the specified thermoplastic block copolymer used to make the composition.

Another embodiment of the invention is a composition comprising a polypropylene comprising about 50 percent to 70 percent isotactic linkages, and a thermoplastic block copolymer comprising hard segments of polystyrene combined with soft segments including ethylene and butylene. This composition contains some physical characteristics that are more desirable than the physical characteristics of the polypropylene and the thermoplastic block copolymer used to make the composition. Such physical characteristics include tensile breaking stress, abrasion resistance, and percent elongation at break.

Another embodiment of the invention is a composition comprising a polypropylene including less than 90 percent isotactic linkages, and a thermoplastic block copolymer comprising hard segments of polystyrene combined with soft segments comprising carbon chains including 2 to 8 carbon atoms. The abrasion resistance measurement (as measured in grams abraded) of the composition is less than the abrasion resistance measurement (as measured in grams abraded) of the specified polypropylene and the specified thermoplastic block copolymer used to make the composition.

DETAILED DESCRIPTION

Embodiments of the invention generally are compositions that include a polypropylene and a thermoplastic block copolymer.

Polypropylene

Suitable polypropylenes for making a composition of this invention have less than 90 percent isotactic linkages. A blend of these polypropylenes and thermoplastic block copolymers provide a composition having specific physical characteristics more desirable than the polypropylene or thermoplastic block copolymer used to make the composition. Isotactic linkages refers to one of the three arrangements that are possible during the polymerization of propylene in which all methyl groups are on one side of an extended chain. The procedure for measuring the percent isotactic linkages of polypropylene is described in the Example Section of this patent application labeled Procedure II For Measuring The Tacticity Of Polypropylene. Examples of polypropylenes with less than 90 percent isotactic linkages include the products sold under the tradename REXFLEX FPO W101, REXFLEX FPO W108, and REXFLEX FPO W104 by the Rexene Products Company of Dallas, Tex. It is even more desirable that the polypropylenes used in the invention have about 50 percent to 70 percent isotactic linkages.

Thermoplastic Block Copolymers

The composition of this invention includes polypropylene having less than 90 percent isotactic linkages and thermoplastic block copolymers. The thermoplastic block copolymers used to make a layer of cover material are selected based on compatibility with the polypropylene and their ability to provide a composition having specific physical characteristics more desirable than the polypropylene or thermoplastic block copolymer used to make the composition. In general terms, block copolymers are macromolecules comprising chemically dissimilar, terminally connected segments. Their sequential arrangement can vary from A—B structures, containing two segments only, to A—B—A block copolymers with three segments, to multiblock —(A—B)$_n$— systems possessing many segments. A unique development resulting from block copolymer technology is the concept of thermoplastic elastomeric behavior.

Block copolymer systems of this type are characterized by rubbery behavior in the absence of chemical cross-linking. This feature permits the fabrication of these materials by means of conventional thermoplastic processing techniques. The key to this unique behavior is the ability to achieve a network structure by physical rather than chemical means. This, in turn results from finely controlled morphology in A—B—A or —(A—B)$_n$— systems containing both flexible and rigid segments.

The simplest arrangement, or architecture, of a block copolymer is the diblock structure, commonly referred to as an A—B block copolymer, which is composed of one segment of "A" repeat units and one segment of "B" repeat units. The second form is the triblock, or A—B—A structure, containing a single segment of B repeat units located between two segments of "A" repeat units. The third basic type is the —(A—B)$_n$— multiblock copolymer, are composed of many alternating "A" and "B" blocks. Another, but less common, variation is the radial block copolymer. This structure takes the form of a star-shaped macromolecule in which three or more diblock sequences radiate from a central hub. Suitable thermoplastic block copolymers may have one of the above architectures. It is preferred that the thermoplastic block copolymer in this invention is the triblock, or A—B—A structure.

From a mechanical property point of view, block copolymers may be conveniently divided, on the basis of room temperature modulus, into two classes-rigid and elastomeric. Rigid materials may be comprised of either two hard segments or of one hard segment together with a minor fraction of a soft segment. A hard segment is defied as one that has a $T_g$ and/or $T_m$ above room temperature, while a soft segment has a $T_g$ (and possibly) a $T_m$) below room temperature. Elastomeric block copolymers normally contain a soft segment together with a minor proportion of a hard segment. Additional characteristics of block copolymers are described in Block Copolymers Overview and Critical Survey", Allen Noshay, James E, McGrath, Academic Press, 1977, incorporated herein by reference.

It is preferred that thermoplastic block copolymers used in this invention be elastomeric and include hard segments of polystyrene monomer units and soft segments comprising carbon chains including 2 to 8 carbon atoms. Suitable commercially available thermoplastic block copolymers include (SBS) styrene-butadiene-styrene block copolymer, (SIS) styrene-isoprene-styrene block copolymer, (SEBS) styrene-ethylene-butylene-styrene block copolymer, (SEP) styrene-ethylene-propylene block copolymer, (SB)n styrene-butadiene or (SI)$_n$ styrene-isoprene multi-arm (branched) copolymer, (EP)$_n$ ethylene-propylene multi-arm (branched) polymer. It is preferred that the soft segments of the block copolymer include butadiene, isoprene, ethylene, propylene, butylene, and combinations thereof. It is most preferred that the thermoplastic block copolymer have soft segments comprising ethylene and butylene. It is preferred that the polystyrene segments comprise less than about 30 percent by weight of the block copolymer. It is most preferred that the polystyrene segments comprise about 13 percent by weight of the block copolymer.

Polymer Blends Comprising Polyolefins and Thermoplastic Block Copolymers

Polymer blends of this invention include a polypropylene having less than 90 percent isotactic linkages and a thermoplastic block copolymer. The blends vary in weight percentages of the polypropylene and thermoplastic block copolymer. Preferably, a polymer blend will have about 80 percent by weight of a polypropylene having less than 90 percent isotactic linkages and about 20 percent weight of a thermoplastic block copolymer to about 20 percent by weight of a polypropylene having less than 90 percent isotactic linkages and 80 percent by weight of a thermoplastic block copolymer. Preferably, a polymer blend will have about 60 percent by weight of a polypropylene with less than 90 percent isotactic linkages and about 40 percent by weight of a thermoplastic block copolymer to about 40 percent by weight of a polypropylene with less than 90 percent isotactic linkages and 60 percent by weight of a thermoplastic block copolymer. All polymer blends may also include additives such as fillers, fibers, antistatic agents, lubricants, wetting agents, foaming agents, surfactants, pigments, dyes, coupling agents, plasticizers, suspending agents and the like.

As mentioned, polymer blends including polypropylene having less than 90 percent isotactic linkages and thermoplastic block copolymers provide compositions typically having physical measurements more desirable than the physical measurements of the specified polypropylene or specified thermoplastic block copolymers used to make the blend. These physical characteristics include the tensile breaking stress, percent elongation at break, and abrasion resistance (measured in grams abraded) as illustrated in the Example Section of this patent application. In addition, a specific blend containing a polypropylene having less than 90 percent isotactic linkages typically has a static coefficient of friction enhanced over a similar blend using polypropylene having greater than 90 percent isotactic linkages as illustrated in the Example Section. It is preferred that all blends of this invention have about 10 percent to 40 percent elongation at yield. Preferably, the percent elongation at yield will be between about 13 percent to 40 percent.

The polymer blends have numerous applications and may be used to form mats, mousepads, pull roll levers, anti-slip surfaces, high friction films, abrasion resistant films, conveyor belts, and protective film coatings. For particular applications, the thermoplastic block copolymer selected may have a Shore A hardness of greater than about 30.

Interestingly, some of the compositions embodied by the invention may have abrasion resistance measurements but not tensile breaking stress measurements more desirable than the measurement of the polypropylene having less than 90 percent isotactic linkages and the thermoplastic block copolymer used to make the compositions. An example of such a composition is illustrated in Table 3 where the composition comprises 20 percent Polymer C and 80 percent Polymer A. There are also examples of polymer compositions having tensile breaking stress measurement more desirable than the polypropylene and the thermoplastic block copolymer used to make the blend, but the blend does not have an abrasion resistant measurement more desirable than the abrasion resistance measurement of the polypropylene and the thermoplastic block copolymer used to make the blend. An example of such a composition is illustrated in Table 3 where the composition comprises 40 percent Polymer C and 60 percent Polymer A. A low grams abraded value is desirable. Even though one physical measurement of the blend may be more desirable than the physical measurement of each polymer making up the blend, not all the physical characteristics of the blend measured may behave that way.

EXAMPLES

The following non-limiting examples will further illustrate the invention. All parts, percentages, ratios, etc., in the examples are by weight unless otherwise indicated. The following abbreviations listed in Table 1 are used throughout. Using the materials described in Table 1, cast polymer films were produced to study the tensile properties, abrasion resistance, percent elongation at break, and static coefficient of friction of the polymer composition.

TABLE 1

| Identification | Polymer | Manufacturer | Location | Description |
|---|---|---|---|---|
| Polymer A | KRATON G1657 | Shell Chemical Company | Houston, Texas | Styrene-Ethylene-Butylene-Styrene (SEBS) Block Copolymer |
| Polymer B | REXFLEX FPO W101 | Rexene Products Company | Dallas, Texas | Flexible Polypropylene |
| Polymer C | REXFLEX FPO W108 | Rexene Products Company | Dallas, Texas | Flexible Polypropylene |
| Polymer D | ESCORENE PP3445 | Exxon Chemical Company | Baytown, Texas | Polypropylene |
| Polymer E | PELLETHANE 2103-70A | Dow Chemical Company | Midland, Michigan | Polyether Polyurethane |

Procedure I For Making A Film

Cast polymer film samples were prepared by first weighing the specified quantity of each polymer pellet in a bucket. The weight percentages for each sample of the polymers are specified in Tables 2–7. The polymer pellets for each sample were combined in a five gallon polyethylene bag. The bag of pellets was then tumbled and shaken until a uniform blend of pellets was obtained. Once the polymer pellets were uniformly blended, the premixed blend of polymers were then melt extruded by a 1.5 inch Johnson extruder (from Johnson Plastic Machinery, Chippewa Falls, Wis.) through an 8 inch sheet die at temperatures ranging from 350 to 450° F. The temperature of the extrusion was set to maintain an extrusion pressure less than 3600 psi. The melt sheet was extruded and then introduced into a nip. The nip was located between the top and middle roll of a vertical stack of three temperature-controlled co-rotating 5-inch diameter (12.70 cm) cylindrical rolls. The cylindrical rolls were part of a vertical 3 roll casting station available from Killion Company, Cedar Grove, N.J. The temperature of the rolls was controlled to 60 to 70° F. using individual Sterlco Model M29410-ACX temperature control units available from Sterling Inc., Milwaukee, Wis. As the molten sheet was solidified by the chilled roll surfaces, the top roll released the sheet to follow the middle roll, and the quenched sheet was subsequently stripped away from the bottom roll. Films made by this process were typically about 0.015 inches (0.038 cm) to 0.025 inches (0.064 cm) thick.

Procedure II For Measuring The Tacticity of Polypropylene

Tacticity of polypropylenes were determined by carbon-13 NMR spectra in o-dichlorobenzene (ODCB) at 110° C. following procedures outlined in "NMR Spectroscopy and Polymer Microstructure", Alan E. Tonelli, VCH Publishers Inc. New York, N.Y., 1989, herein incorporated by reference.

Test Procedure I For Measuring The Load At Break Tensile Strength

The tensile properties of the subject polymer compositions in the form of sample films were evaluated based on procedures described in ASTM Test Method D 882, "Tensile Properties of Thin Plastic Sheeting", incorporated herein by reference. A comprehensive listing of tensile properties, testing procedures, and property calculations are cited in ASTM D882. For the subject compositions at least three 6 inch by ½ inch (15.24 cm×1.27 cm) specimens were cut from each film sample. The average thickness for each film sample was determined by measuring each film specimen and computing an arithmetic average for the film sample. The ends of the film specimens were clamped into a constant rate of extension tensile testing machine, SINTECH serial #T30/88/125 available from MTS Systems Corporation, Cary, N.C. Data acquisition, tensile property calculations, and machine control was performed via TESTWORKS Version 2.1 software available from MTS Systems Corporation, Cary, N.C. For the subject examples the breaking load in pounds, tensile breaking stress in pounds per square inch, percent elongation at break, and percent elongation at yield were utilized for film comparison.

Test Procedure II For Measuring Abrasion Resistance

To assess the abrasion resistance of polymer compositions the grams abraded on each film sample was measured on a Dual Taber Abraser, Model 505 available from Teledyne Taber, North Tonawanda, N.Y. Abrasion test samples were prepared by first attaching the previously prepared films to 11 point manila paper stock using a two sided pressure sensitive adhesive such as SCOTCH 9851 available from Minnesota Mining and Manufacturing Co, St. Paul, Minn. At least three abrasion test discs per film sample, about 4 inches (10.16 cm) in diameter with a ¼ inch (0.64 cm) center hole, were cut from each PSA laminated film sample for abrasion and weighed prior to testing. Each abrasion test disc sample was placed on the abrading turntable and secured with the hold down ring and center nut and washer. The sample abrasion discs were abraded for 1000 cycles at a load of 1000 grams with Calibrate H-18 abrasive wheels. Upon completion of the test the samples were cleaned of loose debris and weighed. The grams abraded was then calculated by subtraction of the after test weight from the before test weight. For additional details covering this procedure, please refer to "Operating Instruction for Taber Model 505 Dual Abraser", Teledyne Taber, North Tonawanda, N.Y., 1967, incorporated herein by reference.

Test Procedure III For Measuring The Load At Break
See Test Procedure 1

Test Procedure IV For Measuring The Percent Elongation At Break
See Test Procedure 1

Test Procedure V For Measuring The Breaking Stress
See Test Procedure 1

Test Procedure VI For Measuring Percent Elongation At Break
See Test Procedure 1

Test Procedure VII For Measuring Percent Elongation At Yield
See Test Procedure 1

Test Procedure VIII For Measuring The Static Coefficient Of Friction

The static coefficient of friction for each film sample was measured on a Thwing-Albert Model 225-1 Friction/Peel Tester available from Thwing-Albert Instrument Company, Philadelphia, Pa. Equipment operation is specified in the Thwing-Albert Instruction Manual, Friction/Peel Tester, Model #225-1 revised 5/94, Software version 2.4. This analysis for the static coefficient of friction measured the horizontal force required to cause movement of a weighted 2 inch (5.08 cm) by 2 inch (5.08 cm) sample of the polymer film against a sample of cloth. The film samples were tested against three different cloth samples; a 14 oz cotton denim cloth, a cellulose acetate fabric (about 100×50, warp yarn {about 36 fibers at 4 denier}×fill yarn {about 20 fibers at 9 denier}), manufactured by Delta Woodside Industries, Greenville, S.C. and a nylon fabric (Style 3204190, 630 denier nylon yarn, 41×41, manufactured by Highland Industries, Inc. Greensboro, N.C.

The friction test specimen were prepared by anchoring a 2 inch (5.08 cm) by 2 inch (5.08 cm) sample of each film to a 2 inch (5.08 cm) by 2 inch (5.08 cm) metal test sled. The test specimen were attached to the sled with a two sided pressure sensitive adhesive such as SCOTCH 9851, available from Minnesota Mining and Manufacturing Company, St. Paul, Minn. The metal test sled weighed 500 grams. An additional weight of 500 grams was applied to the top of the block making the total weight 1000 grams.

To prepare the fabric sample for the friction test a sample fabric approximately 4 inches (10.16 cm) by 12 inches (30.48 cm) was anchored to a metal sheet with a two sided pressure sensitive adhesive tape, such as SCOTCH 9851 to prevent movement and wrinkling of the cloth during the test. The fabric samples prepared for testing were cellulose acetate fabric, denim fabric, and nylon fabric. The cellulose acetate fabric was oriented with the fill yarns parallel to the 12 inch direction of the samples. The 14 oz. denim fabric was tested with the lighter colored (back side) of the cloth to the friction material. The nylon fabric was tested with the fabric parallel to the warp or fill yarns. Each friction test was performed on a new section of cloth parallel to the 12 inch direction on the metal panel.

The metal sheet with the cloth sample adhered was clamped on to the metal platen testing surface with the provided spring clip. The metal test sled with film sample on bottom of the sled and additional weight weighing 1000 grams in total was placed on the fabric and pulled for 10 seconds at a speed of 2 inches (5.08 cm) per minute across the fabric per instructions specified in the instructions manual. The static coefficient of friction was then calculated by the machine wherein the measured horizontal force to cause slippage on the fabric was divided by the 1000 gram normal force of the sled. At least five measurements were recorded for each friction test sample and pull roll cover sample on each fabric. Arithmetic averages were calculated by the friction/peel tester.

Example 1

Example 1 films were created from a series of polymer blends of a polypropylene comprising greater than 90 percent isotactic linkages and a thermoplastic block copolymer.

The films were created by Procedure I For Making A Film. The percent isotactic linkages of Polymer D was shown to be about 90.5 percent isotactic linkages by Procedure II for Measuring The Tacticity of Polypropylene. The films also included a thermoplastic block copolymer, Polymer A. The weight percent of each polymer in the blend was illustrated in Table 2. The film sample thickness, load at break, breaking stress, percent elongation at break, percent elongation at yield, and the static coefficient of friction were determined by the aforementioned test procedures. Films made solely from Polymer E, Polymer A, and Polymer D were also tested by the aforementioned procedures and illustrated for comparison in Table 2.

TABLE 2

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer D | 0.015 | 36.7 | 4769 | 583 | 0.064 | 0.22 | 0.26 | 0.30 | 6.9 |
| 70% Polymer D/30% Polymer A | 0.018 | 35.8 | 3974 | 538 | 0.153 | 0.32 | 0.34 | 0.39 | 5.9 |
| 60% Polymer D/40% Polymer A | 0.020 | 36.3 | 3639 | 532 | 0.173 | 0.51 | 0.46 | 0.46 | 5.4 |
| 50% Polymer D/50% Polymer A | 0.022 | 35.4 | 3216 | 513 | 0.145 | 0.51 | 0.58 | 0.59 | 6.0 |
| 40% Polymer D/60% Polymer A | 0.023 | 40.8 | 3517 | 540 | 0.185 | 0.72 | 0.73 | 0.70 | 8.2 |
| 30% Polymer D/70% Polymer A | 0.025 | 38.2 | 3109 | 542 | 0.181 | 0.91 | 0.91 | 0.91 | 6.9 |
| Polymer A | 0.023 | 9.9 | 873 | 401 | 0.177 | 1.59 | 1.84 | 1.82 | 34.9 |
| Polymer E | 0.017 | 18.8 | 2167 | 436 | 0.037 | 1.11 | 1.15 | 1.07 | 30.2 |

Table 2 illustrates film blends comprising polypropylene with greater than 90 percent isotactic linkages have measured physical characteristics falling between the measured physical characteristics of films made solely of the specified polypropylene and films made solely of specified thermoplastic block copolymers. For example, the blend comprising 70 percent Polymer D and 30 percent Polymer A had a breaking stress measurement of 3974. The tensile breaking stress measurement of Polymer D was 4769 and the tensile breaking stress of Polymer A was 873. The blend had a measurement in between that of Polymer D and Polymer A. All films tested produced tensile breaking stress measurements between the tensile breaking stress measurements of films made of Polymer A or Polymer D.

Example 2

Example 2 films were created from a series of polymer blends of a polypropylene comprising less than 90 percent isotactic linkages and a thermoplastic block copolymer. The films were created by Procedure I For Making A Film. The percent isotactic linkages of Polymer C was shown to be about 66.0 percent isotactic linkages by Procedure II for Measuring The Tacticity of Polypropylene. The films also included a thermoplastic block copolymer, Polymer A. The weight percent of each polymer in the blend was illustrated in Table 3. The film sample thickness, load at break, breaking stress, percent elongation at break, percent elongation at yield, and the static coefficient of friction were determined by the aforementioned test procedures. Films made solely from Polymer A, Polymer C, and Polymer E were also tested by the aforementioned procedures and illustrated for comparison in Table 3.

TABLE 3

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer C | 0.019 | 20.3 | 2138 | 468 | 0.191 | 0.48 | 0.38 | 0.52 | 16.1 |
| 75% Polymer C/25% Polymer A | 0.015 | 16.8 | 2324 | 504 | 0.155 | 0.54 | 0.49 | 0.51 | 15.2 |
| 60% Polymer C/40% Polymer A | 0.020 | 30.3 | 3060 | 641 | 0.159 | 1.06 | 0.89 | 0.91 | 13.9 |
| 50% Polymer C/50% Polymer A | 0.019 | 27.4 | 2767 | 602 | 0.149 | 0.89 | 0.85 | 0.91 | 17.5 |
| 40% Polymer C/60% Polymer A | 0.022 | 27.2 | 2536 | 594 | 0.197 | 1.26 | 1.20 | 1.20 | 19.2 |
| 30% Polymer C/70% Polymer A | 0.022 | 26.5 | 2355 | 565 | 0.101 | 1.33 | 1.33 | 1.31 | 32.3 |
| 25% Polymer C/75% Polymer A | 0.015 | 16.7 | 2289 | 540 | 0.107 | 1.12 | 1.15 | 1.31 | 19.9 |
| 20% Polymer C/80% Polymer A | 0.022 | 22.1 | 1944 | 555 | 0.055 | 1.64 | 1.38 | 1.43 | 18.6 |
| Polymer A | 0.023 | 9.9 | 873 | 401 | 0.177 | 1.59 | 1.84 | 1.82 | 34.9 |
| Polymer E | 0.017 | 18.8 | 2167 | 436 | 0.037 | 1.11 | 1.15 | 1.07 | 30.2 |

Table 3 illustrates that films formed from blend compositions of Polymer A and Polymer C have physical measurements more desirable than the physical measurements of solely Polymer A or Polymer C used to make the composition. For example, a blend comprising 60 percent Polymer C and 40 percent Polymer A had a tensile breaking stress of 3060. The tensile breaking stress of a film made of Polymer C was 2138 and the tensile breaking stress of a film made of Polymer A was 873. The blend had a tensile breaking stress measurement greater than Polymer A and Polymer C. A high tensile breaking stress measurement is desirable. In addition, the elongation at break measurements are primarily all greater for the polymer blends than the measurements of films made solely of Polymer A and the films made solely of Polymer C. Synergy is observed because the films made of the blends have characteristics more desirable than the films made of specified polymers used to make the composition.

Abrasion resistance as defied by Test Procedure II For Measuring Abrasion Resistance was also measured as the amount of grams abraded from the film. The films produced from polymer blends of Polymer A and Polymer C typically have less grams abraded than the films made solely of Polymer A and films made solely of Polymer C. For example, a blend comprising 60 percent Polymer C and 40 percent Polymer A had an abrasion resistance measurement of 0.159. The abrasion resistance measurement of a film made only of Polymer C was 0.191 and a film made only of Polymer A was 0.177. The film made of a blend of polymers had an abrasion resistance measurement less than films made of Polymer A and films made of Polymer C. A low abrasion resistance measurement is desirable. In Table 3, all of the films made from a blend of Polymer A and Polymer C, except one film, had less grams removed during the abrasion test than the films made from polymers.

Static coefficient of friction values of the films produced in Example 2 were also measured. The static coefficient of friction values of the films produced from blends of Polymer C and the Polymer A fall between the static coefficient of friction values of the film made solely of Polymer A and the film made solely of Polymer C. However, in Example 2, the film produced from polymer blends of 60 percent Polymer C and 40 percent Polymer A had a coefficient of friction value approaching 1.0. Compared to Example 1, the film produced from polymer blends of 60 percent Polymer D and 40 percent Polymer A had a coefficient of friction value approaching 0.5. At a specific weight percent blend composition, the static coefficient of friction of the films produced in Example 1 had a lower static coefficient of friction than the films produced in Example 2.

Example 3

Example 3 films were created from a series of polymer blends of a polypropylene comprising less than 90 percent isotactic linkages and a thermoplastic block copolymer. The films were created by Procedure I For Making A Film. The percent isotactic linkages of Polymer B was shown to be about 52.1 percent isotactic linkages by Procedure II for Measuring The Tacticity of Polypropylene. The films also included a thermoplastic block copolymer, Polymer A. The weight percent of each polymer in the blend was illustrated in Table 4. The film sample thickness, load at break, breaking stress, percent elongation at break, percent elongation at yield, and the static coefficient of friction were determined by the aforementioned test procedures. Films made solely from Polymer A, Polymer B, and Polymer E were also tested by the aforementioned procedures and illustrated for comparison in Table 4.

TABLE 4

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| Polymer B | 0.023 | 18.0 | 1522 | 597 | 0.217 | 0.59 | 0.75 | 0.72 | 27.9 |
| 80% Polymer B/20% Polymer A | 0.021 | 21.9 | 2105 | 627 | 0.134 | 0.90 | 1.03 | 0.98 | 25.2 |

TABLE 4-continued

| Polymer Blend Identification | Tensile Thickness (inches) | Load at Break (pounds) | Tensile Breaking Stress (psi) | Percent Elongation At Break | Grams Abraded (grams) | Static Coefficient of Friction on Denim | Static Coefficient of Friction on Nylon | Static Coefficient of Friction on Cellulose Acetate | Percent Elongation at Yield |
|---|---|---|---|---|---|---|---|---|---|
| 70% Polymer B/30% Polymer A | 0.023 | 31.5 | 2759 | 675 | 0.164 | 0.70 | 0.94 | 0.81 | 19.8 |
| 60% Polymer B/40% Polymer A | 0.021 | 26.4 | 2488 | 666 | 0.111 | 1.01 | 1.19 | 1.05 | 26.6 |
| 50% Polymer B/50% Polymer A | 0.022 | 26.9 | 2516 | 677 | 0.134 | 1.12 | 1.40 | 1.39 | 22.4 |
| 40% Polymer B/60% Polymer A | 0.021 | 28.5 | 2713 | 639 | 0.088 | 1.23 | 1.42 | 1.29 | 20.1 |
| Polymer A | 0.023 | 9.9 | 873 | 401 | 0.177 | 1.59 | 1.84 | 1.82 | 34.9 |
| Polymer E | 0.017 | 18.8 | 2167 | 436 | 0.037 | 1.11 | 1.15 | 1.07 | 30.2 |

Table 4 illustrates that films made from a blend composition of Polymer A and Polymer B have physical characteristic measurements more desirable than the physical characteristic measurements solely of Polymer A or solely of Polymer B used to make the composition. Synergy is observed because the polymer blends have more desirable characteristics than the individual polymers used to make the composition. When abrasion resistance was measured, all films produced from these polymer blends had less grams abraded than the films produced solely from Polymer A and films produced solely from Polymer B. It is desirable that a film have a low number of grams removed during the abrasion test because such films are characteristically more durable than films having a high number of grams removed during the abrasion test.

Static coefficient of friction values of the films produced in Example 3 were also measured. The static coefficient of friction values of the films produced from blends of Polymer B and Polymer A fall between the static coefficient of friction measurements of the film made solely of Polymer A and the film made solely of Polymer B. In Example 3, the film produced from polymer blends of 60 percent Polymer B and 40 percent Polymer A had a coefficient of friction value exceeding 1.0. In Example 1, the film produced from polymer blends of 60 percent Polymer D and 40 percent Polymer A had a coefficient of friction value approaching 0.5. At a specific weight percent blend composition, the static coefficient of friction of the films produced in Example 1 had a lower static coefficient of friction than the films produced in Example 3 or Example 2.

What is claimed is:

1. A polypropylene and thermoplastic copolymer blend consisting essentially of:
   (a) a homopolypropylene component comprising about 50 percent to 70 percent isotactic linkages; and
   (b) a thermoplastic block copolymer component comprising hard segments of polystyrene combined with soft segments including a combination of ethylene and butylene; wherein the blend is in the range of about 80 percent by weight of the homopolypropylene and about 20 percent by weight of the thermoplastic block copolymer to about 20 percent by weight of the homopolypropylene and 80 percent by weight of the thermoplastic block copolymer.

2. The polypropylene and thermoplastic copolymer blend of claim 1, wherein the hard segments of polystyrene comprise about 10 percent to 20 percent by weight of the thermoplastic block polymer.

3. The polypropylene and thermoplastic copolymer blend of claim 1, wherein the hard segments of polystyrene comprise about 13 percent by weight of the thermoplastic block copolymer.

4. The polypropylene and thermoplastic copolymer blend of claim 1, wherein the soft segments are saturated carbon chains comprising 2 to 8 carbon atoms.

5. The polypropylene and thermoplastic copolymer blend of claim 1, wherein the thermoplastic block copolymer has a triblock structure.

6. The polypropylene and thermoplastic copolymer blend of claim 1, wherein the homopolypropylene comprises about 66 percent isotactic linkages.

7. The polypropylene and thermoplastic copolymer blend of claim 1, wherein the homopolypropylene comprises about 52 percent isotactic linkages.

8. The polypropylene and thermoplastic copolymer blend of claim 1, wherein the blend contains additives.

9. A polypropylene and thermoplastic copolymer blend consisting of
   (a) a homopolypropylene component comprising about 50 to 70 percent isotactic linkages; and
   (b) a thermoplastic block copolymer component comprising hard segments of polystyrene combined with soft segments including a combination of ethylene and butylene; wherein the blend is in the range of about 80 percent by weight of the homopolypropylene and about 20 percent by weight of the thermoplastic block copolymer to about 20 percent by weight of the homopolypropylene and 80 percent by weight of the thermoplastic block copolymer.

10. A polypropylene and thermoplastic copolymer blend consisting of
   (a) a homopolypropylene component comprising from 50 to 90 percent isotactic linkages;
   (b) a thermoplastic block copolymer component comprising hard segments of polystyrene combined with soft segments comprising 2 to 8 carbon atoms; wherein the blend is in the range of about 80 percent by weight of the homopolypropylene and about 20 percent by weight of the thermoplastic block copolymer to about 20 percent by weight of the homopolypropylene and 80 percent by weight of the thermoplastic block copolymer; and
   (c) optionally, an additive chosen from the group consisting of a filler, a fiber, an antistatic agent, a lubricant, a wetting agent, a foaming agent, a surfactant, a pigment, a dye, a coupling agent, a plasticizer, and a suspending agent.

11. The polypropylene and thermoplastic copolymer blend of claim 10, wherein the hard segments of polystyrene comprise less than about 30 percent by weight of the thermoplastic block copolymer.

12. The polypropylene and thermoplastic copolymer blend of claim 10, wherein the hard segments of polystyrene comprise about 13 percent by weight of the thermoplastic block copolymer.

13. The polypropylene and thermoplastic copolymer blend of claim 10, wherein the soft segments are selected from the group consisting of butadiene, isoprene, ethylene, propylene, butylene and combinations thereof.

14. The polypropylene and thermoplastic copolymer blend of claim 10, wherein the soft segments are saturated carbon chains comprising 2 to 8 carbon atoms.

15. The polypropylene and thermoplastic copolymer blend of claim 10, wherein the soft segments comprise a combination of ethylene and butylene.

16. The polypropylene and thermoplastic copolymer blend of claim 10, wherein the thermoplastic block copolymer has a triblock structure.

* * * * *

UNITED STATES PATENT AND TRADEMARK OFFICE
CERTIFICATE OF CORRECTION

PATENT NO.    : 6,359,068 B1
DATED         : March 19, 2002
INVENTOR(S)   : Moren, Louis S.

It is certified that error appears in the above-identified patent and that said Letters Patent is hereby corrected as shown below:

Column 6,
Line 65, "yam" should read -- yarn --.

Column 9,
Line 40, "defied" should read -- defined --.

Signed and Sealed this

Twenty-fifth Day of March, 2003

JAMES E. ROGAN
*Director of the United States Patent and Trademark Office*